United States Patent Office 3,153,072
Patented Oct. 13, 1964

3,153,072
MONO- AND DICARBOXYLIC LINEAR, NON-CONJUGATED POLYACETYLENIC COMPOUNDS
John H. Wotiz, Mentor, and Bobby F. Adams, Painesville, Ohio, assignors to Diamond Alkali Company, Cleveland, Ohio, a corporation of Delaware
No Drawing. Filed Oct. 3, 1960, Ser. No. 60,222
7 Claims. (Cl. 260—413)

This invention relates to novel mono and dicarboxylic linear, non-conjugated polyacetylenic compounds and salts thereof, their preparation and use.

Broadly, this invention relates to novel mono and dicarboxylic linear, non-conjugated, polyacetylenic polyyne compounds of the structure:

(I)
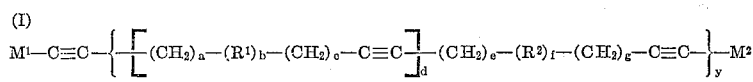

wherein $M^1$ and $M^2$ are the same or different and are selected from the group consisting of hydrogen, carboxy and carboxy salts, i.e., —COOM, wherein M is a metal such as an alkali metal, e.g., sodium; ammonium or substituted ammonium; with the proviso that only one of $M^1$ and $M^2$ can be hydrogen; $a$ is a number from 0 to 20, inclusive; $b$ is a number from 0 to 2, inclusive; $c$ is a number from 0 to 20, inclusive; $d$ is a number from 0 to 20, inclusive; $e$ is a number from 0 to 20, inclusive; $f$ is a number from 0 to 2, inclusive; $g$ is a number from 0 to 20, inclusive; $y$ is a number from 2 to 100; $R^1$ and $R^2$ are the same or different radicals selected from the group consisting of alkylene radicals, e.g., radicals having the structure —$C_mH_{2m}$— (and corresponding branched chain radicals), wherein $m$ is a number from 1 to 50; arylene radicals, e.g.,

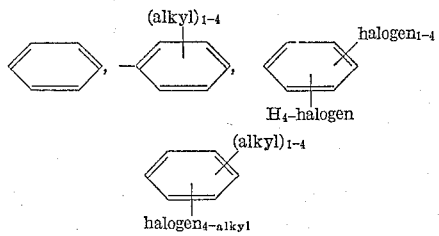

as well as corresponding ortho and meta radicals; oxygen; sulfur;

mercury; boron; boron-containing radicals such as

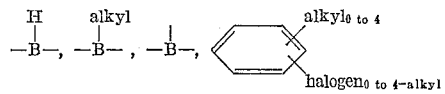

heterocyclic radicals such as

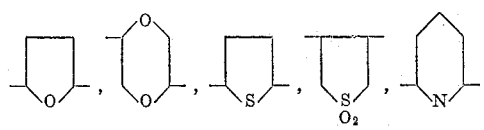

aryl-substituted alkylene radicals, e.g.,

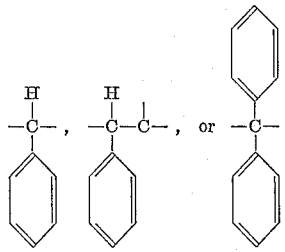

substituted alkylene radicals, e.g.,

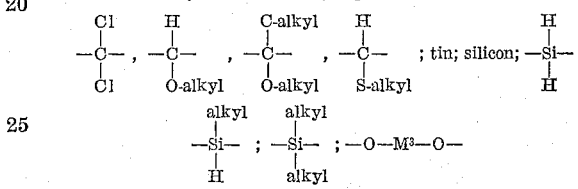

(wherein $M^3$ is selected from the group consisting of calcium, barium, zinc, tin, lead,

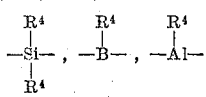

$R^4$ being selected from the group consisting of hydrogen, lower alkyl, i.e., up to about 10 carbon atoms, or aryl radicals, e.g., phenyl or naphthyl).

More particularly, novel carboxy compounds of this invention have the structure:

(II)   $R—(C\equiv C—R')_n—C\equiv C—COOR''$ wherein $n$ is a number from 2 to 20, inclusive; R is hydrogen, —COOH, —COOM (wherein M is an alkali metal, i.e., sodium, potassium, lithium, rubidium, or cesium; an alkaline earth metal, i.e., calcium, barium and strontium; and ammonium radicals including substituted ammonium radicals, tin, lead, chromium, manganese, zinc, aluminum, titanium, or the like). Illustrative salts are sodium, potassium, lithium, rubidium, cesium, calcium, barium, strontium, amine salts such as those obtained by reacting one or both of the carboxyl groups with ammonia, monomethylamine, trimethylamine, monoethylamine, diethylamine, triethylamine, monopropylamine, dipropylamine, monobutylamine, diisobutylamine, n-hexylamine, amylamine, methyldiethylamine, methylethylamine, methyldipropylamine, butylisopropylamine, monoethanolamine, isopropanolamine, dimethylisobutanolamine, n-hexanolamine, ethylenediamine and propylenediamine; naphthenates, or the like; R'' is hydrogen, or M as just defined; and R' is alkylene.

The terms "alkyl" and "alkylene," i.e., mono and divalent radicals, respectively, as used in the specification and claims, unless otherwise defined, are intended to refer to various monovalent straight chain, e.g., $CH_3-(CH_2)_{a^1}$ groups, as well as branched chain derivatives thereof wherein $a^1$ is a number from 0 to 15; and to corresponding straight and branched chain divalent groups, e.g., $-(CH_2-)_{b^1}$ wherein $b^1$ is a number from 1 to 50. The term "lower" used with either "alkyl" or "alkylene" is intended to refer to radicals containing up to 10 carbon atoms.

Specific examples of "alkyl" and "alkylene radicals" are those containing 2 to 5 carbon atoms, e.g.:

| Alkylene Radicals | Alkyl Radicals |
|---|---|
| $-CH_2-CH_2-$ | $CH_3-CH_2-$ |
| $-CH_2-CH_2-CH_2-$ | $CH_3-CH_2-CH_2-$ |
| $-CH_2-CH_2-CH_2-CH_2-$ | $CH_3-CH-CH_2-$ |
| $-CH_2-CH_2-CH_2-CH_2-CH_2-$ | $\quad\quad\quad\;\; \mid$ |
|  | $\quad\quad\quad CH_3$ |
| $-CH_2-CH_2-CH-CH_2-$ |  |
| $\quad\quad\quad\quad\;\; \mid$ | $CH_3-CH_2-CH_2-CH_2-$ |
| $\quad\quad\quad\quad CH_3$ | $CH_3-CH_2-CH_2-CH_2-CH_2-$ |
| $-CH_2-CH-CH_2-$ | $CH_3-CH-CH_2-CH_2-$ |
| $\quad\quad\;\; \mid$ | $\quad\quad\;\; \mid$ |
| $\quad\quad CH_3$ | $\quad\quad CH_3$ |
| $-CH_2-CH-CH-$ | $CH_3-CH-CH-$ |
| $\quad\quad\;\; \mid \;\;\;\; \mid$ | $\quad\quad\;\; \mid \;\;\;\; \mid$ |
| $\quad\quad CH_3 \; CH_3$ | $\quad\quad CH_3 \; CH_3$ |
| $-CH-CH-$ |  |
| $\;\; \mid \quad\;\;\; \mid$ |  |
| $\; CH_3 \; CH_2-CH_3$ |  |
| $-CH_2-CH-CH_2-$ |  |
| $\quad\quad\;\; \mid$ |  |
| $\quad\quad CH_2-CH_3$ |  |

Compounds of this invention are useful in various applications, including pesticidal uses. As used in the specification and claims, the terms "pesticide," "pests," and "pesticidal" are intended to refer to the killing and/or controlling of the growth of plants, bacteria, microorganisms, fungi, or the like. Thus, it will be appreciated that applications commonly termed bactericidal, herbicidal, fungicidal, or the like, are contemplated. Other uses of compounds of this invention include applications as polymers, solid rocket fuel components, e.g., binders, as coatings, films, fibers, intermediates, polymerization catalysts, high energy fuels, or fuel components, rocket fuel starters, plasticizers, stabilizers, and the like.

Specific illustrative compounds of this invention are the following:

2,8,14,20-heneicosatetrayne-1-oic acid:

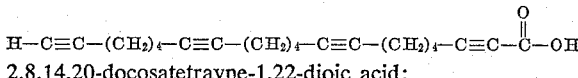

2,8,14,20-docosatetrayne-1,22-dioic acid:

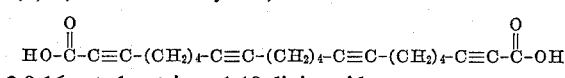

2,9,16-octadecatriyne-1,18-dioic acid:

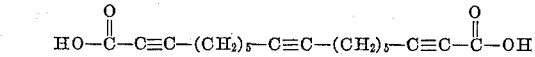

2,9,16-heptadecatriyne-1-oic acid:

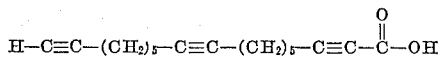

Compounds of this invention generally can be prepared by reacting an organometallic derivative of a linear, non-conjugated $\lambda,\omega$-polyyne hydrocarbon with carbon dioxide or other source of carboxyl radicals. In practice, such compounds can be prepared by reacting a formed linear, non-conjugated $\lambda,\omega$-polyyne with a compound such as an alkali metal amide, e.g., sodium amide ($NaNH_2$) which is preferred, potassium amide, lithium amide, or the like; alkaline earth metal amide, e.g., calcium amide, strontium amide, barium amide, or the like; alkali metal hydrides, e.g., sodium hydride, potassium hydride, lithium hydride, or the like; alkaline earth metal hydrides, e.g., calcium hydride, strontium hydride, barium hydride, or the like; or Grignard reagents comprising alkyl magnesium halides preferably ethyl magnesium bromide, the Grignard reagents being prepared by reacting an alkyl halide, e.g., ethyl bromide, with dry magnesium such as magnesium turnings.

The reaction can be carried out in liquid ammonia, tetrahydrofuran, tetrahydropyran, ethyl ether or other alkyl ether, or hydrocarbon solvent such as pentane or hexane. When a Grignard reagent is formed, advantageous solvents include ethyl ether, tetrahydrofuran, tertiary amines e.g., triethyl amine, tripropyl amine, or the like.

Preparation of the organometallic derivative of the polyyne generally can be carried out at a temperature from $-33°$ C. to about $150°$ C. with superatmospheric pressure if necessary or desired.

The organometallic polyyne derivative, typically a $\lambda,\omega$-disodium compound or a di-Grignard compound, is then reacted with carbon dioxide at a temperature within the range of about $-80°$ C. (approximating the freezing temperature of carbon dioxide) to about $100°$ C.; a preferred temperature range is about $-10°$ C. to $50°$ C. In some instances, temperatures of the order of $300°$ C. can be employed. The pressure may range from atmospheric pressure to about 1000 p.s.i.g., 500 p.s.i.g. being preferred at present.

The carbon dioxide utilized should be of high purity. Solid carbon dioxide (Dry-Ice®) is a convenient source of carbon dioxide. Alternatively, gaseous carbon dioxide, e.g., from pressurized cylinders also can be used and is often preferred where a maximum freedom from water contamination of the carbon dioxide is desired. Sufficient carbon dioxide, from whatever source, is employed to provide a stoichiometric excess over that required to carbonate the polyacetylenic compound.

The thus-formed carboxy reaction product is hydrolyzed, typically at a temperature within the range from about room temperature ($25°$ C.) to $100°$ C., cooling of the hydrolysis mixture generally being effected, as with ice, e.g., hydrolysis in an aqueous medium such as an $NH_4Cl$ solution. The hydrolysis mixture then is treated with an aqueous mineral acid such as hydrochloric, sulfuric, phosphoric, or the like, to convert the salt into the desired acid. The product is then recovered by filtering, drying and recrystallization, if desired. If a salt per se is desired, the acidification can be omitted.

Instead of converting the formed polyyne hydrocarbon into an organometallic derivative as indicated hereinbefore, it is possible, of course, in the formation of the polyyne hydrocarbon (as described in Ser. No. 831,930, filed August 6, 1959) to utilize excess of the mono and/or dimetallo acetylide or polyacetylide, eliminate any ammonia or other solvent reactive with carbon dioxide and directly carbonate the polyyne material without intermediate separation of the polyyne hydrocarbon. In such an instance, of course, the organometallic derivative is formed in situ.

Illustrative of acetylenic hydrocarbons useful as starting materials for the production of compounds of this invention, either as such, or during their preparation, are the following:

Acetylene:

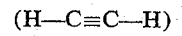

1,7-octadiyne:

1,9,17-octadecatriyne:

1,8,15-hexadecatriyne:

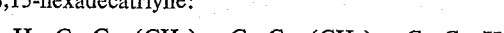

1,7,13-tetradecatriyne:

1,6,11-dodecatriyne:

1,6,11,16-heptadecatetrayne:

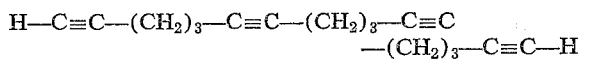

1,7,13,19-eicosatetrayne:

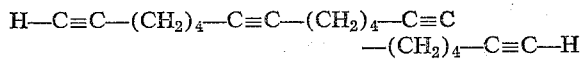

1,8,15,22-tricosatetrayne:

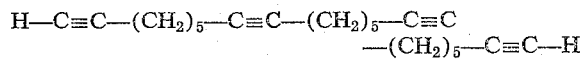

1,9,17,25-hexacosatetrayne:

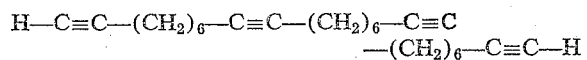

1,10,19,28-nonacosatetrayne:

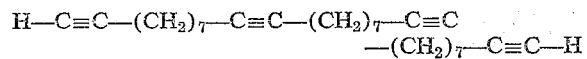

1,7,13,19,25-hexacosapentayne:

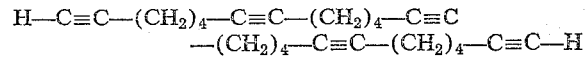

While compounds of this invention may be employed in a variety of applications, biologically active or otherwise, when employed as biologically active materials it will be understood, of course, that such compounds may be utilized in diverse formulations, both liquid and solid, including finely-divided powders and granular materials as well as liquids such as solutions, concentrates, dispersions, emulsifiable concentrates, emulsions, slurries and the like, depending upon the application intended and the formulation medium desired.

These compounds may be used alone or in combination with other known biologically active materials such as other acetylenically unsaturated compounds, organic phosphate pesticides, fertilizers, chlorinated hydrocarbon insecticides, foliage and soil fungicides and the like.

Thus, it will be appreciated that compounds of this invention may be employed to form biologically active substances containing such compounds as essential active ingredients, which compositions may also include finely-divided dry or liquid carriers, extenders, fillers, conditioners, including various clays, such as talc, spent catalyst, alumina silica materials, liquids, solvents, diluents or the like, including water and various organic liquids such as benzene, toluene, chlorinated benzene, acetone, cyclohexanone, chlorinated xylene, carbon tetrachloride, ethylene dichloride, tetrachloroethylene, carbon disulfide, and alcohols at various temperatures thereof.

When liquid formulations are employed or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol, U.S. Patent 2,504,064). Other suitable surface active agents may be found in an article by John W. McCutcheon in Soap and Chemical Specialties, vol. 4, Nos. 7-10 (1955).

The term "carrier" as employed in the specification and claims is intended to refer broadly to materials constituting a major proportion of a biologically active or other formulation and hence, includes finely-divided materials, both liquids and solids, as aforementioned conveniently used in such applications.

In order that those skilled in the art may more completely understand the present invention and the preferred methods by which the same may be carried into effect, the following specific examples are offered:

EXAMPLE 1

Part A.—Preparation of 1,7,13,19-Eicosatetrayne

To a flask equipped with cooling means, stirrer, and condenser and containing 2½ to 3 liters of anhydrous liquid ammonia, 1.8 g. of ferric nitrate hydrate is added with stirring, followed by the addition of 2 g. of sodium metal. Dry air is then bubbled into the mixture for about 30 seconds to activate the catalyst and 137 g. of sodium is added at a rate which causes a brisk evolution of hydrogen. When no further hydrogen is evolved, the stirrer is speeded up to wash the flask walls free of spattered sodium. Acetylene is then added to the mixture until the milky suspension begins to clear, typically about ½ to 2 hours. 648 g. (3.0 mole) of tetramethylene dibromide is then added at a rate to retain a gentle reflux of liquid ammonia. Upon reaction completion, the ammonia is allowed to evaporate.

About 200 to 300 mls. of water is then added with caution and two layers form, i.e., an organic layer and an aqueous layer. The aqueous layer is extracted several times with 100 ml. portions of ethyl ether. The combined ether extracts are washed with dilute hydrogen chloride and dilute sodium carbonate aqueous solutions and dried over calcium sulfate. The ether is removed during distillation with 1,7,13-tetradecatriyne, $C_{14}H_{18}$, boiling at 111° to 112° C. at 1.0 mm. Hg and 1,7,13,19-eicosatetrayne, $C_{20}H_{26}$, boiling at 65° to 170° C. at 0.3 mm. Hg.

Preparation of the indicated triyne is indicated by the following elemental analytical data:

| Element | Actual, percent by weight | Calculated, percent by weight |
| --- | --- | --- |
| C | 89.2 | 90.2 |
| H | 9.6 | 9.8 |
| Molecular Weight | 188 | 186 |

Preparation of the desired tetrayne also is indicated by the following elemental analytical data:

| Element | Actual, percent by weight | Calculated, percent by weight |
| --- | --- | --- |
| C | 89.3 | 90.2 |
| H | 9.8 | 9.8 |
| Molecular Weight | 276 | 266 |

Part B

To an autoclave containing a stirred suspension of 156 g. (4.0 mol) of sodamide in 2.5 liters of liquid ammonia at −33° C. are added 532 g. (2.0 mol) of 1,7,13,19-eicosatetrayne. The ammonia is allowed to evaporate and is replaced by a mixture of one liter each of benzene, tetrahydrofuran, and diethyl ether. The formed, suspended, disodio salt is reacted with $CO_2$ at 500 p.s.i.g. at 0° to 5° C. for sixty hours. The autoclave is then vented, the slurry mixed with water and the resulting top layer removed for starting hydrocarbon recovery.

The alkaline aqueous layer is poured onto an ice HCl mixture to precipitate the acid. The acid is purified by extraction with petroleum ether in a Soxhlet extractor. The resulting monobasic acid (2,8,14,20-heneicosatetrayne-1-oic acid) is soluble in hot petroleum ether.

The dibasic acid (2,8,14,20-docosatetrayne-1,22-dioic acid) is insoluble in petroleum ether and is separated by filtration. Chilling of the petroleum ether solution separates out the monobasic acid as a white powder M.P. 54°–5° C. The dibasic acid is recrystallized from a mixture of ethyl ether and petroleum ether and melts at 104–5° C.

Analytical data indicates preparation of the desired compounds and are as follows:

|  | Percent C | | Percent H | | Neutral Equiv. | |
|---|---|---|---|---|---|---|
|  | Act. | Calc. | Act. | Calc. | Act. | Calc. |
| 2,8,14,20-heneicosa-tetrayne-1-oic acid | 80.9 | 81.3 | 8.4 | 8.4 | 311 316 | 310 |
| 2,8,14,20-docosatet-rayne-1,20-dioic acid | 74.5 | 74.6 | 7.5 | 7.35 | 175 | 177 |

Act.—Actual.
Calc.—Calculated.
Equiv.—Equivalent.

Infrared spectra are consistent with the indicated structures.

Part C.—Bactericidal Activity 2,8,14,20-heneicosatrayne-1-oic acid is examined for ability to inhibit the growth of the bacterial species (*Erwenia amylovora*, *Xanthomonas phaseoli* and *Micrococcus pyrogenes* var. *aureus*) at a concentration of 250 p.p.m. The formulation [1] is diluted without maintaining the concentration of the emulsifier or solvent. The first two of the above-named test species are Gram negative rods, the third species is Gram positive. They are all cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbimetric measurement. Each of three test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The tubes are then set aside at room temperature for four hours. After this exposure period, transfers are made by means of a standard four mm. platinum loop to 7 ml. of sterile broth into test tubes arranged in racks similar to those for the medication tubes. The broth tubes are then incubated for 48 hours at 29° C. at which time growth is measured by use of a Bausch & Lomb spectronic "20" direct reading colorimeter. A reading is recorded for each test tube after shaking. Three replicates of each organism serve as controls. Calculations are made on percent of the mean check readings. This figure subtracted from 100 gives percent control as compared to checks. 2,8,14,20-heneicosatrayn-1-oic acid gives a 100% control against each organism as compared to a check.

Part D.—Fungicidal Activity (P. infestans)

Fungicidal utility is further demonstrated by the ability of 2,8,14,20-heneicosatrayn-1-oic acid to protect tomato plants against the late blight fungus, *Phytophthora infestans*. The method employs tomato plants 5 to 7 inches high of the variety Bonny Best. 100 ml. of the test formulation (1000 p.p.m. and 200 p.p.m. of 2,8,14,20-heneicosatrayn-1-oic acid—5% acetone—0.01% Triton X-155—the balance water) are sprayed on the plants at 40 lbs. air pressure while the plants are being rotated on a turntable in a spray chamber. After the spray deposit is dry, the treated plants and comparable untreated controls are again sprayed as described above, with a sporangial suspension containing approximately 150,000 sporangia of *P. infestans* per ml. 30 seconds at 20 lbs. The plants are held in a 100% humid atmosphere for 24 hours at 60° F. to permit spore germination and infection. After 2 to 4 days, lesion counts are made on the three uppermost fully expanded leaves. Comparing the number of lesions on the test plants and control plants shows disease control of 80% and 79%, respectively, on the test plants.

Part E.—Herbicidal Activity (Post Emergence)

Tomato plants, variety Bonny Best, 5 to 7 inches tall, and bean plants, variety Tendergreen, just as the trifoliate leaves are beginning to unfold, are sprayed with test formulation at a concentration of 2400 p.p.m. (0.48%) or about two pounds active chemical per 100 gallons of water. Four test plants are all sprayed simultaneously with 80 ml. of the standard cyclohexanone formulation [2] at 40 pounds per square inch (p.s.i.g.) while being rotated on a turntable in a spray hood. The concentrations of the solvent, cyclohexanone, and emulsifier Triton X-155 are always maintained at 12.5 percent and 0.05% by volume, respectively, irrespective of the concentration of the toxicant.

After the plants are dry, they are removed to the greenhouse. Records are taken 14 days after treatment. Phytotoxicity is rated on a scale from 0 to 11 based on the Weber-Fechner law which states that visual acuity depends on the logarithm of the intensity of the stimulus. In grading phytotoxicity, the stimulus changes at the 50 percent level. The grades are as follows based on percent of leaf area destroyed; 0=no injury, 1=0 to 3, 2=3 to 6, 3=6 to 12, 4=12 to 25, 5=25 to 50, 6=50 to 75, 7=85 to 87, 8=87 to 94, 9=94 to 97, 10=97 to 100, and at 11 the plant is dead. 2,8,14,20-heneicosatetrayn-1-oic acid kills tomato plants and gives a rating of 10 on bean plants.

Part F.—Spore Inhibition (Alternaria oleracea)

Inhibition of spore germination on glass slides by 2,8,14,20-heneicosatetrayne-1-oic acid is evaluated by checking its ability in concentrations of 1000, 100, 10 and 1.0 p.p.m. to inhibit germination of spores from 7 to 10 day old cultures of *Alternaria oleracea*. Germination records are taken after 20 hours of incubation at 22° C. Copper sulfate is used as a standard reference material. 2,8,14,20-heneicosatetrayne-1-oic acid inhibits germination of half the spores (ED 50) at a concentration of 1.0 to 10 p.p.m.

Part G

*Panagrellus redivivus* nematodes are exposed to 2,8,14,20-heneicosatetrayne-1-oic acid in watch glasses (27 mm. diam.–8 mm. deep) placed within a 9 cm. Petri dish. The glasses each receive 0.4 ml. of a test formulation [3] at 1250 p.p.m. 0.1 ml. of Panagrellus suspension is added to each glass thus bringing the concentration down to 1000 p.p.m. Each watch glass contains 30 to 40 nematodes. At the end of 48 hours, mortality counts are made. 2,8,14,20-heneicosatetrayne-1-oic acid causes a 100% nematode kill at 100 p.p.m.

EXAMPLE 2

*Preparation of 2,8,14,20-Heneicosatetrayne-1-Oic Acid and 2,8,14,20-Docosatetrayne-1,22-Dioic Acid*

3 moles of $Na\!+\!C\equiv C\!-\!(CH_2)_4\!+\!_3C\equiv C\!-\!Na$ is prepared from 3 moles of $H\!+\!C\equiv C\!-\!(CH_2)_4\!+\!_3C\equiv C\!-\!H$ and 7 moles of $NaNH_2$ in 3.5 liters anhydrous ammonia. The ammonia is replaced by 6 gallons of a 1:1:1 (by volume) mixture of benzene, ethyl ether and tetrahydrofuran and the suspended salt pressurized with $CO_2$ at 25° C. and 500 p.s.i. in a 10-gallon autoclave for 60 hrs. After

---

[1] 0.1 g. test compound is combined with 4 ml. of acetone and 2 ml. of solution of 0.5% by volume of Triton X-155 in water.

[2] 384 mg. test chemical combined with 10 ml. cyclohexanone, 8 ml. of Triton X-155 solution of Part B and 62 ml. distilled water.

[3] 0.1 g. test compound, 4 ml. acetone, 2 ml. stock emulsifier solution (0.5% Triton X-155 by volume) with sufficient distilled water added to obtain a total volume of 80 ml.

venting, the mixture is treated with 1 gallon of water and worked up as in Example 1, Part A, "neutral fraction" of 354 g. is found and extraction of the acid fraction with n-pentane gives 133 g. (26% yield) of soluble white product, M.P. 54–5° C. which is identified as 2,8,14,20-heneicosatetrayne-1-oic acid,

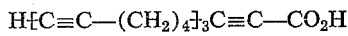

The results of the chemical analysis indicate the formation of the desired $C_{21}H_{26}O_2$, and are as follows:

| Element | Actual, percent by weight | Calculated, percent by weight |
|---|---|---|
| C | 80.9 | 81.3 |
| H | 8.4 | 8.4 |

The actual neutralization equivalent found is 313, while the calculated value is 310. The infrared spectrum is consistent with the assigned structure. The n-pentane-insoluble fraction is crystallized from ethyl ether to give 290 g. (49% yield) of white powder, M.P. 104–5° C., and is identified as 2,8,14,20-docosatetrayne-1,22-dioic acid,

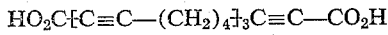

The results of the chemical analysis indicate the formation of the desired $C_{22}H_{26}O_4$, and are as follows:

| Element | Actual, percent by weight | Calculated, percent by weight |
|---|---|---|
| C | 74.5 | 74.6 |
| H | 7.5 | 7.35 |

The actual neutralization equivalent found is 175, while the calculated value is 177. The infrared spectrum is consistent with the indicated structure.

EXAMPLE 3

*Preparation of 2,9,16-Heptadecatriyne-1-Oic Acid and 2,9,16-Octadecatriyne-1,18-Dioic Acid*

2 moles of $Na[C\equiv C-(CH_2)_5]_2C\equiv C-Na$ are prepared from 2 moles of $H[C\equiv C-(CH_2)_5]_2C\equiv C-H$ and 5 moles of sodamide in 3.5 liters of anhydrous ammonia. The ammonia is replaced by 5 gallons of a 1:1 (by vol.) mixture of ether and benzene and pressurized with cylinder $CO_2$ in a 10-gallon autoclave for 60 hrs. at 25° C. and 500 p.s.i. The autoclave is vented and the mixture poured into 1 gallon of water. The top layer is separated, dried and solvent-stripped to recover 160 g. of neutral fraction. The aqueous layer is acidified with HCl and the precipitated solid taken into ethyl ether. The ether is removed in vacuo, and the deposited crude acid is extracted with n-pentane in a Soxhlet extractor. The resultant solution, on chilling, gives 30 g. (6.5% of theory) of white crystals, M.P. 51–2° C. and is identified as 2,9,16-heptadecatriyne-1-oic acid,

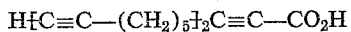

The results of the chemical analysis indicate the formation of the desired $C_{17}H_{22}O_2$, and are as follows:

| Element | Actual, percent by weight | Calculated, percent by weight |
|---|---|---|
| C | 79.1 | 79.0 |
| H | 8.6 | 8.6 |

The actual neutralization equivalent found is 246, while the calculated value is 258. The infrared spectrum is consistent with the assigned structure.

Recrystallization of the pentane-insoluble portion from carbon tetrachloride gives 32 g. (5% yield) of white product, M.P. 106–7° C., and is identified as 2,9,16-octadecatriyne-1,18-dioic acid,

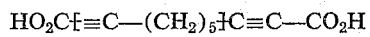

The results of the chemical analysis indicate the formation of the desired $C_{18}H_{22}O_4$, and are as follows:

| Element | Actual, percent by weight | Calculated, percent by weight |
|---|---|---|
| C | 71.4 | 71.5 |
| H | 7.4 | 7.3 |

The actual neutralization equivalent found is 153 and 158, while the calculated value is 151. The infrared spectrum is consistent with the assigned structure.

EXAMPLE 3

Using the procedure of Example 1, Part C, 2,8,14,20-docosatetrayn-1,22-dioic acid; 2,9,16-heptadecatriyne-1-oic acid; and 2,9,16-octadecatriyne-1,18-dioic acid each cause a 100% kill of the bacteria.

It is to be understood that although the invention has been described with specific reference to particular embodiments thereof, it is not to be so limited since changes and alterations therein may be made which are within the full intended scope of this invention as defined by the appended claims.

What is claimed is:

1. A compound of the formula

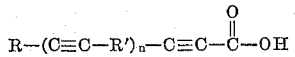

wherein R is selected from the group consisting of hydrogen and —COOH; R′ is alkylene containing 3 to 7 carbon atoms; and $n$ is a number from 2 to 4, inclusive.

2. 2,8,14,20-heneicosatetrayne-1-oic acid.
3. 2,8,14,20-docosatetraynye-1,22-dioic acid.
4. 2,9,16-octadecatriyne-1,18-dioic acid.
5. 2,9,16-heptadecatriyne-1-oic acid.
6. 2,8,14-pentadecatriyne-1-oic acid.
7. 2,8,14-hexadecatriyne-1,16-dioic acid.

References Cited in the file of this patent

Wagner and Zook: "Synthetic Organic Chemistry," 1953, John Wiley and Sons, N.Y., pages 424–425.

"Chemistry and Industry," Oct. 10, 1959, page 1288.